US 6,808,112 B2

(12) United States Patent
Jacobi et al.

(10) Patent No.: US 6,808,112 B2
(45) Date of Patent: Oct. 26, 2004

(54) AUTOMATED SELF SERVICE HOTEL/ MOTEL FRONT DESK ATTENDANT SYSTEM

(76) Inventors: Robert L. Jacobi, 1414 Shadow Bay La., Brandon, FL (US) 33510-2321; Randy S. Goodell, 1946 Tarpon Ct., Wesley Chapel, FL (US) 33543

(*) Notice: Subject to any disclaimer, the term of this patent is extended or adjusted under 35 U.S.C. 154(b) by 46 days.

(21) Appl. No.: 10/251,043

(22) Filed: Sep. 20, 2002

(65) Prior Publication Data

US 2003/0132289 A1 Jul. 17, 2003

Related U.S. Application Data

(60) Provisional application No. 60/348,495, filed on Jan. 16, 2002.

(51) Int. Cl.[7] .................................................. G06F 7/08
(52) U.S. Cl. ............................ 235/381; 235/379; 705/5
(58) Field of Search ................................ 235/381, 379, 235/380, 382, 383; 705/5

(56) References Cited

U.S. PATENT DOCUMENTS

| | | | |
|---|---|---|---|
| 3,656,113 A | | 4/1972 | Lince |
| 4,752,876 A | | 6/1988 | Couch et al. |
| 5,233,167 A | * | 8/1993 | Markman et al. ........... 235/375 |
| 5,463,546 A | | 10/1995 | Parkhurst |
| 5,842,188 A | * | 11/1998 | Ramsey et al. ............. 705/416 |
| 5,917,697 A | * | 6/1999 | Wang .......................... 361/695 |
| 5,939,694 A | | 8/1999 | Holcomb et al. |
| 5,946,660 A | * | 8/1999 | McCarty et al. ............... 705/5 |
| 6,061,668 A | * | 5/2000 | Sharrow ...................... 705/400 |
| 6,588,549 B2 | * | 7/2003 | Wike et al. .................. 186/61 |
| 2001/0034623 A1 | | 10/2001 | Chung |

OTHER PUBLICATIONS

NCR, "NCR—Easy Point Solutions: Xpress Hotel Check–In," Transforming Transactions Into Relationships, NCR Corporation (USA), p. 1–2, (Oct. 23, 2002).
NCR, "NCR Copyright Notice," Transforming Transactions Into Relationships, NCR Corporation (Dayton, Ohio), p. 1–3, (Oct. 23, 2000).

* cited by examiner

Primary Examiner—Michael G. Lee
Assistant Examiner—Seung H Lee
(74) Attorney, Agent, or Firm—Larson & Larson, PA; James E. Larson

(57) ABSTRACT

A guest operated front desk processing station is all contained in an upright stand alone housing. The housing contains a touch screen and keyboard for guest inputting information, and a signature pad in an upper portion. The housing front face contains a credit card swipe device for scanning a credit, debit or brand card, a slot for dispensing a receipt from a printer inside the housing and a key slot for dispensing a key card generated by a key making device within the housing. The housing front face also contains a slot for accepting various currency denominations and a slot for dispensing currency change. The processing station is connected by a network data cable to a Property Management System.

11 Claims, 4 Drawing Sheets

AUTOMATED SELF SERVICE HOTEL/MOTEL FRONT DESK ATTENDANT SYSTEM

PRIOR PROVISIONAL APPLICATION

A prior provisional application was filed on Oct. 10, 2001, but was destroyed by the Post Office. A second prior provisional application was filed on Jan. 16, 2002, Ser. No. 60/348,495. Priority is claimed from Oct. 10, 2001.

BACKGROUND OF THE INVENTION

This invention relates to systems for automatically checking guests in or out of a hotel or motel. More particularly, it refers to a system coupled to a hotel/motel or other lodging facility Property Management System (PMS) which permits guest check in or check out without the need to consult hotel/motel staff.

All hotel/motel environments use human beings to process basic guest information, to register a guest and enable the guest to utilize hotel services and facilities. Examples of this information are: guest name, address, telephone number, payment method, type of room desired, room rate selection, length of stay and number of guests to use the facilities. Every hotel/motel guest processes this information, either in advance, with an advance reservation or as a non-reservation guest upon initial arrival at the hotel/motel. Whether done in advance or upon arrival personal information is verified and human staff at the property finalizes payment methods. Most hotel/motels use computerized systems to track guest information, advance reservations and account receivable information. In the lodging industry, such systems are called Property Management Systems (PMS).

Computer technology has been used for many years in the hotel/motel industry as shown in U.S. Pat. No. 3,656,113 describing a system for continuously displaying the status of available rooms; U.S. Pat. No. 4,758,876 describing a self-service terminal for room key dispensing; U.S. Pat. No. 5,463,546 describing a system for identifying and showing pictures of available rooms and dispensing a key for a selected room upon receipt of payment; and U.S. Pat. No. 5,939,695 describing a touch screen check-in-station for generating key cards.

Although the prior art technology systems aid the hotel/motel staff in checking guests in and out, there is no known system for combining all the prior art systems into a self-contained unit, operable without hotel/motel staff, that can be installed in a hotel/motel environment and be compatible with a site Property Management System. Such a self-contained unit is needed in the hotel/motel industry.

SUMMARY OF THE INVENTION

The present invention solves the industry need by providing an Automated Front Desk Attendant System (hereafter AFDA) that can replace most front desk staff and permit the guest to input all required check-in and check-out information directly into a computer sub-system interfacing with a hotel/motel or other lodging facility Property Management System without the need to consult lodging facility staff. The guest pays by credit card, debit card, brand card or cash by inserting his/her card or cash into the appropriate slot in a stand up kiosk cabinet. The guest selects from the reservation or other available rooms at indicated rates by use of a touch screen. A guest card room key is then dispersed by the kiosk and the guest has completed check in. During check out, the guest accesses his/her account by various secure methods including a PIN code and receives a printed out bill from which he/she makes full payment by credit card, debit card, brand card or cash. All transactions move by a network data cable from the computer sub-system in the kiosk to a PMS database from which the hotel/motel automatically runs end of day processing such as night audit, room and tax postings.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE BEST MODE

Figure 1:
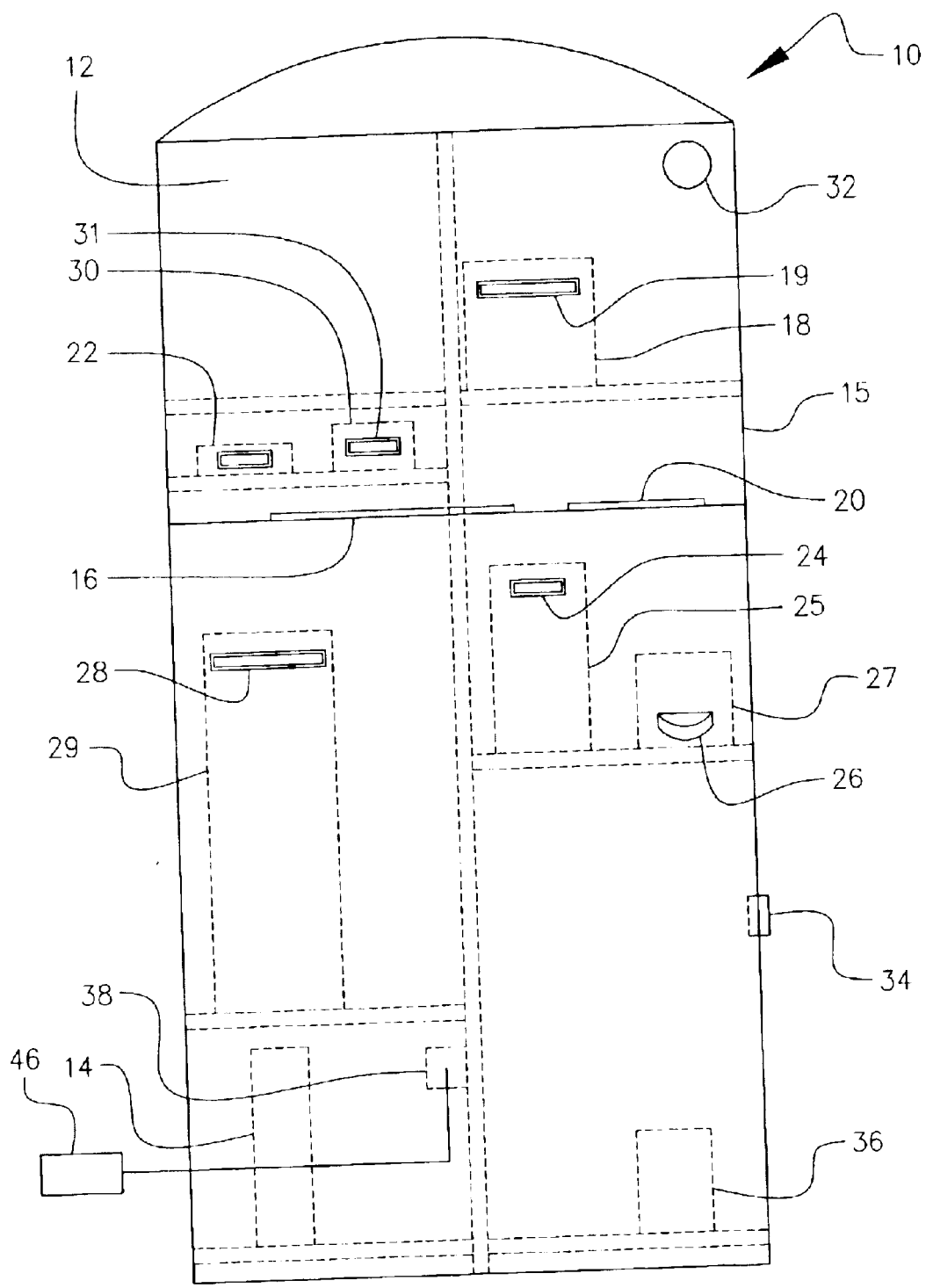
FIG. 1 is a front view of the kiosk apparatus used in the system of this invention with interior components shown in phantom.
Figure 2:
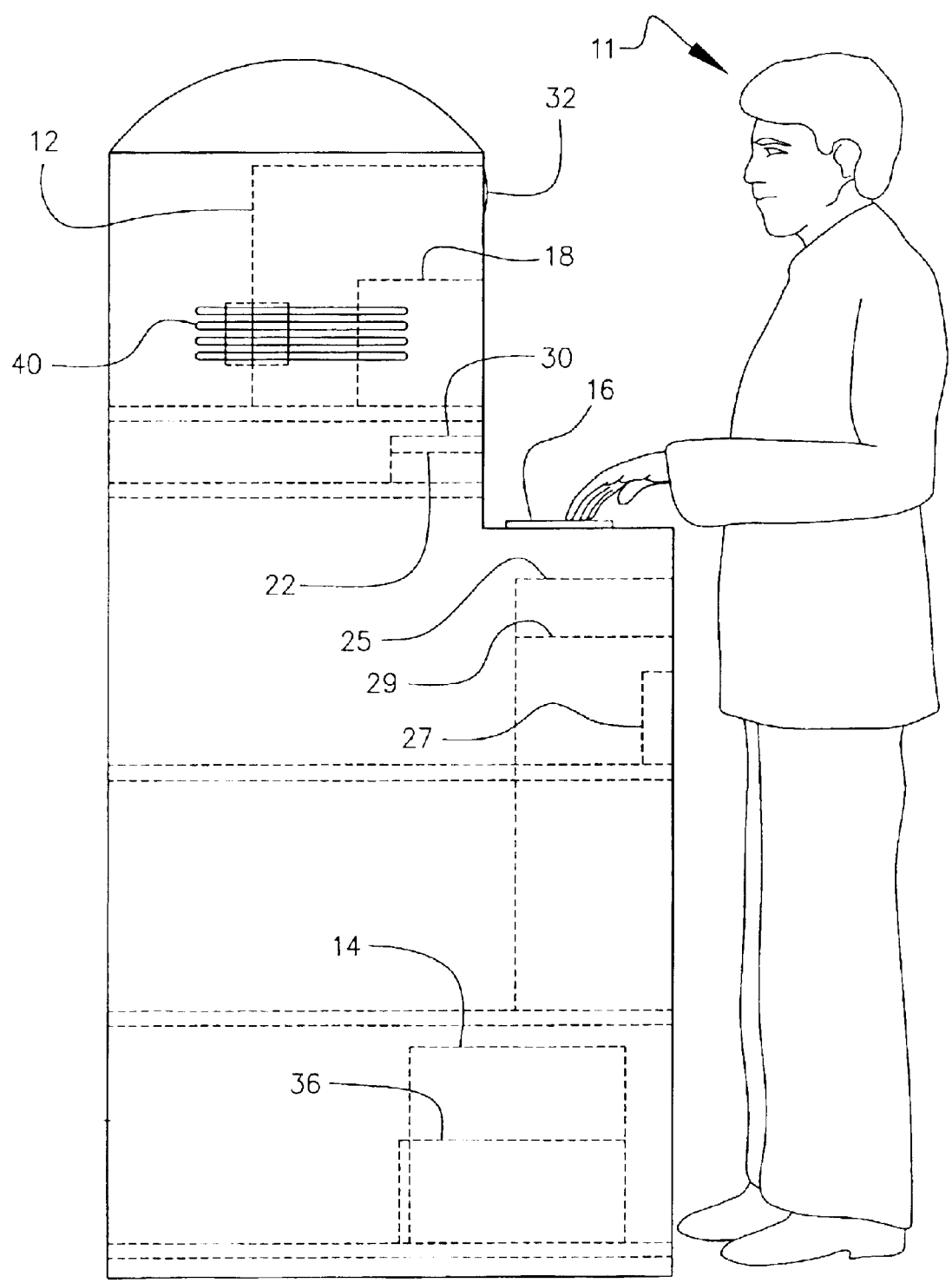
FIG. 2 is a side view of the kiosk of FIG. 1.

Throughout the following detailed description, the same reference numerals refer to the same elements in all figures.

Referring to FIG. 1, the housing 10 is generally a kiosk cabinet in an upright position. The housing 10 contains a computer screen 12 with touch screen technology activated by a computer 14 located within the interior of housing 10. In addition to the computer screen 12, upper portion 15 of the housing 10 also contains a computer keyboard 16 to permit a guest 11 to input individual guest items, such as name and address, length of stay, payment type and arrival and departure dates, directly into computer 14. Additional information can be inputted through the computer screen 12 which is a touch screen type. The guest's signature is obtained on a signature pad 20 and any printed data for the guest comes from a computer printer 18 inside the housing, ejecting receipts through a slot 19 located in the top portion 15 of the housing 10.

The guest 11 has an option to pay by credit card, debit card, brand card or cash. In the event that a credit, debit or brand card is employed for payment by the guest, then the guest inserts his/her card into the card swipe device 22 at the front of the housing 10. If the guest wishes to pay by cash, a bill acceptor slot 24 leads to a storage unit 25 inside the housing 10. The bill acceptor 24 will accept U.S. currency of various denominations. A bill return slot 28 from an internally located dispensing unit 29 and a return change cup 26 with an internally located coin dispenser 27 also are located in the front of the housing 10.

In response to the input into the computer 14 by the guest either through the computer keyboard 16 or the touch screen 12, a key card is made by a room key maker 30 located within the housing 10. A slot 31 will eject a key card for the guest. Recorded messages to assist the guest will be heard through a speaker 32 located in the housing 10. The housing components are run by normal house electric power passed into housing 10 through connector 34. As a temporary backup, an uninterrupted power supply unit in the form of a battery 36 is located within housing 10.

The computer 14 is connected by an interface device 38 to a property management system 46. The Property Management System is a well known system in the prior art for use by lodging facilities to record room availability, prices and other material data employed by the lodging facilities. The housing 10 also contains cabinet cooling fan 40 and interface software 42 to enable the PMS 46 to interface with computer 14. The software operating system 44 is shown in FIGS. 3 and 4.

In use, the lodging facility staff inputs information into the Property Management System 46 by employing standard computer data processing fields and keyboard entry.

Figure 3:
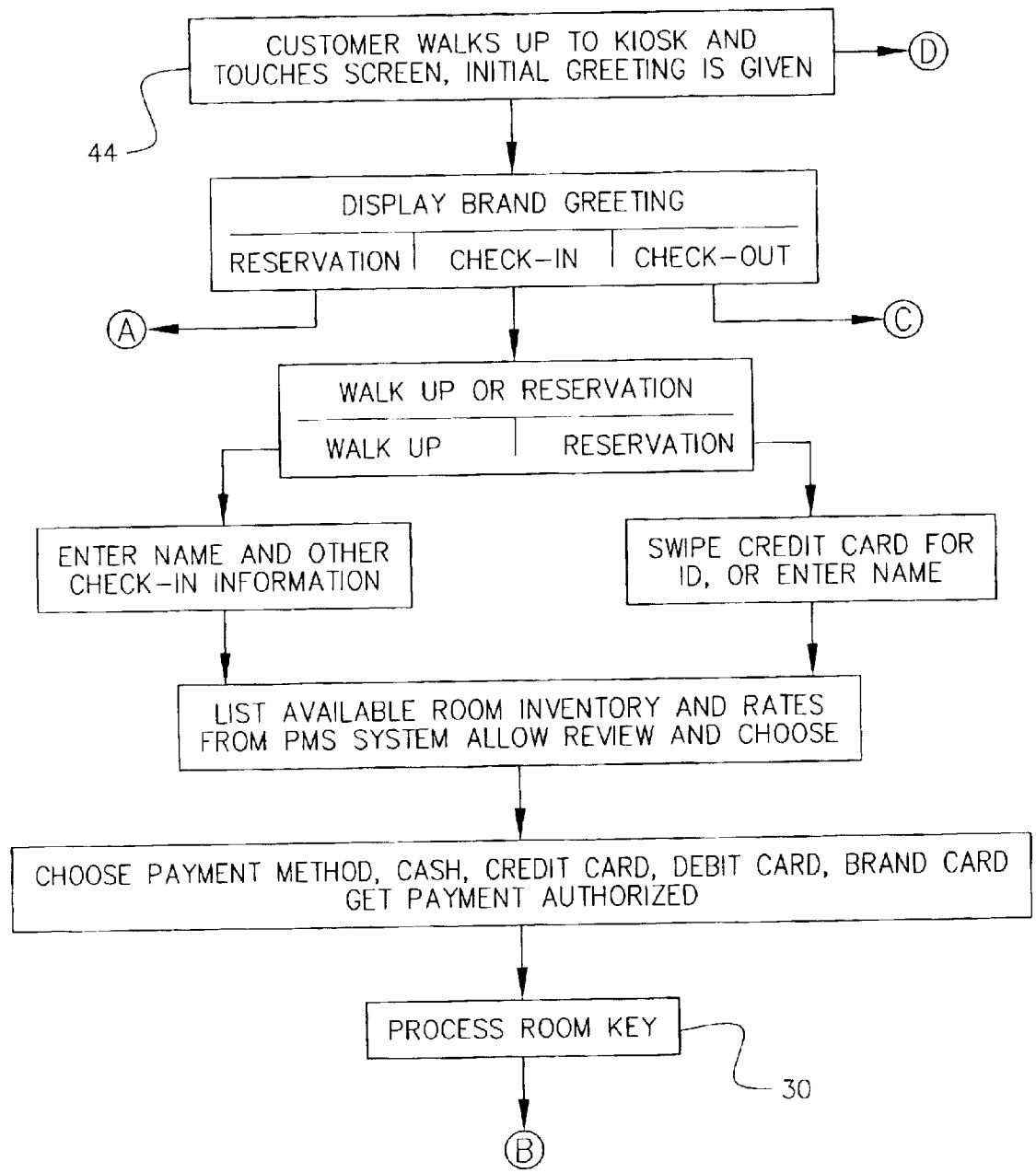
FIGS. 3 and 4 are schematic flow charts showing the operation of the check in and check out system.
Figure 4:
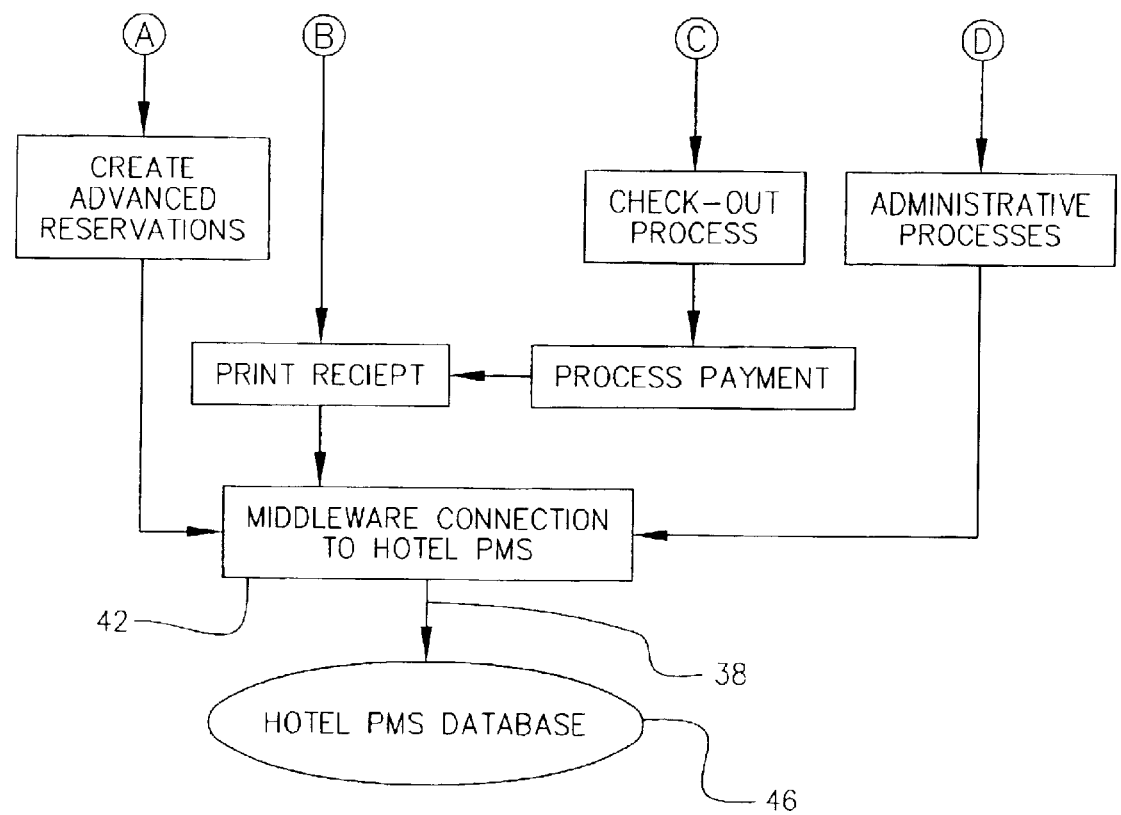

Referring to FIG. 3, a guest or customer walks up to the cabinet 10 and touches the touch screen 12. This generates the computer activity. Thereafter, the program provides a greeting through speaker 32 or on the computer screen 12 to the guest and in response to the guest swiping his/her credit, debit or brand card or typing in a reservation confirmation number or his/her name, displays the reservation. A PIN number typed into the computer 14 by the guest using the keyboard 16 protects guest personal information.

If the guest does not have a reservation, the program provides for an indication of availability on the computer screen. The guest then swipes his/her credit, debit or brand card on the credit swipe 22. If the guest does not have a credit, debit or brand card, the guest enters his/her name by using the keypad 16. The PMS then feeds information into the computer 14 which displays on the computer screen 12 the availability of room inventory. The guest then chooses a method of payment, makes payment by credit card, debit card, brand card or cash, obtains payment authorization and subsequently receives a room key card through slot 30. At this point the guest is completely checked in and can go directly to his/her room.

As seen in FIGS. 3 and 4, there are up to three options, A, B, or C, available to the guest and any one or more can be employed by the guest. D are the administrative functions normally accomplished by human staff that are automated by AFDA. These include daily routine functions such as end of day accounting procedures, night audit procedures and postings and other administrative duties. In a first option A, the guest creates an advance reservation by inputting information into the computer keyboard 16. This connects to the lodging facility's PMS system which will provide the reservation information back on the computer screen 12 to the guest. Secondly, in option B, the guest has the option to check in either with or without a reservation. The guest selects a room type, room rate and inputs their payment method, name, address, room type, length of stay, number of guests and his/her PIN code during this process by using the keyboard 16 or the touch screen 12. A receipt is printed out through printer 18 at the end of the transaction. Thirdly, in option C, the guest check out process is shown. The guest touches the appropriate portion on the touch screen 12 or types in a PIN number and receives a printed receipt of all finalized payment of charges through printer 18. The guest is then checked out and can proceed on his/her other business with his/her credit, debit or brand card account balance reflecting the charges at the lodging facility. If the guest pays with currency by inserting the currency in the bill acceptor 24 change is received through the bill return 28 and the change return 26.

Equivalent devices and procedures can be employed to substitute for those set forth above in order to obtain the same results in the same way.

Having disclosed the invention, what is claimed follows:

1. A lodging facility front desk guest operated processing station connected to a Property Management System, the station comprising:

an upright stand alone housing containing a touch screen, the availability of rooms and rates appearing on the screen in response to a touch, a keyboard for inputting guest information, and a signature pad in an upper portion;

a credit, debit or brand card swipe device positioned on a front face of the housing for scanning a credit, debit or brand card;

a key slot on a front face of the housing for dispensing a room key card from a key maker within the housing;

a currency slot on a front face of the housing for accepting various denominations of currency, the currency slot leading to a receptacle for the currency within the housing;

a printer within the housing leading to a slot on the front face for dispensing guest receipts, a currency return slot in a front face of the housing connected to a means within the housing for storing and dispensing paper and coin currency; and a connector mounted on the housing for interconnecting a computer within the housing with a first end of a network data cable, a second end of the network data cable connected to the Property Management System.

2. The lodging facility front desk guest operated processing station according to claim 1 wherein an uninterrupted power supply battery is located within the housing for temporarily supplying electrical power to the computer absent outside electric service.

3. The lodging facility front desk guest operated processing station according to claim 1 wherein a guest touching the touch screen activates the guest processing station.

4. The lodging facility front desk guest operated processing station according to claim 1 wherein all guest information is protected by a PIN number punched into the keyboard by the guest.

5. The lodging facility front desk guest operated processing station according to claim 1 wherein a fan is provided within the housing for cooling the computer.

6. A terminal located in a lodging facility connected by a network data cable to a Property Management System, the terminal operable by a guest without lodging facility staff direct involvement to check in or out of the lodging facility, the terminal comprising:

a stand alone housing containing on an external portion a touch screen, the availability of rooms and rates appearing on the screen in response to a touch, a keyboard for inputting guest personal data, a signature pad, a swipe device for scanning credit, debit or brand payment card, a key slot for dispensing a room key card, a currency slot for accepting various denominations of U.S. currency, a currency dispensing slot, a cup for coin change, a slot for ejecting printed receipts and a network data cable leading to the Property Management System;

the housing containing internally a computer programmed to interface with the touch screen, the keyboard, the signature pad, the swipe device, a key making device within the housing, a paper printing and storage device with the housing, a currency receiving and recording device within the housing, a currency dispensing device within the housing and the computer connected with the network data cable to the lodging facility Property Management System, so that upon activation of the terminal by a guest, a check in or check out procedure can be carried out without lodging facility staff assistance.

7. The terminal for use by a lodging facility guest according to claim 6 wherein the terminal is activated by a guest touching the touch screen.

8. The terminal for use by a lodging facility guest according to claim 6 wherein the quest personal data is protected by the guest typing a PIN code on the keyboard.

9. The terminal for use by a lodging facility. guest according to claim 6 wherein a fan is mounted within the housing to cool the computer.

10. The terminal for use by a lodging facility guest according to claim 6 wherein a battery and transformer are mounted within the housing for temporary stand-by power in case of outside electrical failure.

11. The terminal for use by a lodging facility guest according to claim 6 wherein the lodging facility Property Management System provides night audit, room and tax postings based on information received from the computer within the terminal housing.

* * * * *